United States Patent [19]

Notoya

[11] 4,422,222
[45] Dec. 27, 1983

[54] FASTENING STRUCTURE

[75] Inventor: Yoshiaki Notoya, Zushi, Japan

[73] Assignee: Nifco Inc., Yokohama, Japan

[21] Appl. No.: 313,521

[22] Filed: Oct. 21, 1981

[30] Foreign Application Priority Data

Nov. 5, 1980 [JP] Japan .......................... 55-157333[U]

[51] Int. Cl.³ ...................... A44B 17/00; A44B 21/00
[52] U.S. Cl. ...................................... 24/614; 24/289;
24/297; 24/682; 24/697; 411/349; 411/508
[58] Field of Search ................ 24/214, 221 A, 221 R,
24/289, 292, 293, 297; 411/15, 349, 409, 508,
509, 515

[56] References Cited

U.S. PATENT DOCUMENTS

| | | | |
|---|---|---|---|
| D. 209,171 | 11/1967 | Myatt | 24/221 A |
| 2,692,414 | 10/1954 | Poupitch | 24/293 |
| 2,836,215 | 5/1958 | Rapata | 24/297 |
| 3,246,375 | 4/1966 | Landwer | 24/297 |
| 3,443,783 | 5/1969 | Fisher | 24/221 R |
| 3,651,545 | 3/1972 | Hara | 411/548 |
| 4,114,339 | 9/1978 | Ito | 24/214 |
| 4,247,219 | 1/1981 | Ausprung | 24/221 R |
| 4,261,151 | 4/1981 | Ito | 24/214 |
| 4,285,103 | 8/1981 | Inamoto | 24/221 A |
| 4,342,139 | 8/1982 | Tanaka | 24/297 |

Primary Examiner—Robert A. Hafer
Assistant Examiner—Paul S. Polakowski
Attorney, Agent, or Firm—Trexler, Bushnell & Wolters, Ltd.

[57] ABSTRACT

A fastener for detachably fastening two workpieces together in non-rotative relation is disclosed. The fastener comprises a base and first and second catch portions. The first catch portion is integral with and extends outwardly from the base along a first side thereof. The second catch portion is integral with and extends outwardly from the base along a second side thereof opposite the first side. The first workpiece has a through aperture of predetermined shape and a preformed recess proximate to the aperture. The second catch portion of the fastener is detachably snap engageable with the aperture of the first workpiece. The second workpiece also has a through aperture of predetermined shape. The first catch portion of the fastener is non-rotatively, detachably engageable with the aperture of the second workpiece. The fastener further includes anti-rotation means integral with and extending outwardly from the base intermediate the first and second catch portions and engageable in the recess for preventing rotation of the fastener relative to the first workpiece after the second catch portion has been brought into snap engagement with the first workpiece aperture. Also disclosed is a method for fastening the fastener to the workpieces.

3 Claims, 13 Drawing Figures

Fig.(B)

FASTENING STRUCTURE

BACKGROUND OF THE INVENTION

This invention relates to a fastening structure using a plastic fastener, and more particularly to an improved fastening structure of the type which permits repeated attachment and detachment.

The basic function of plastic fasteners is to fasten two parts together. However, a fastener which is merely capable of fastening two parts together is often not sufficient. For example, when such a fastener is used for mounting a radiator grille to a vehicle body, the fastener must have a structure which allows the radiator grille to be detached and re-attached when necessary for repairs or the like.

A prior art fastener which by and large satisfies these requirements is disclosed in Japanese Patent Application Public Disclosure No. 99435/1980. This known fastener is used for example for mounting a radiator grille on a vehicle body, and is composed of a rotatable shaft, a head with a special (e.g. rhombic) configuration provided on one end of the shaft, and an anchor-shaped catch member provided on the other end. Meanwhile, an aperture for engaging the catch member is provided in advance in the vehicle body, while the radiator grille is provided with an aperture large enough to allow the head to pass through when the shaft is rotated by 45°. Fastening of the radiator grille to the vehicle body using this fastener is carried out by firstly bringing the fastener head into registration with the aperture in the radiator grille and inserting it, then turning it by 45° so as to make it inextractable. Next, the fastener's catch member is inserted into the aperture in the vehicle, thus joining the radiator grille to the vehicle body. The procedure for detaching the radiator grille and for re-using the fastener involves considerable trouble. That is to say, a slot is provided in advance on the fastener head, and a screwdriver of some such means is inserted into this slot and the head turned by 45°, and when the head registers with the aperture in the radiator grille, it is extracted. In this way the grille and the body are separated. Next, in order to re-join them, a screwdriver is passed through the aperture and the head is turned by 45°, whereafter it is passed through the aperture. Otherwise, the fastener is detached from the vehicle body and the joining operation is repeated in accordance with the fastening procedure described above. Of these two operations, the latter requires less skill than the former, and the re-joining can be carried out relatively easily. However, this kind of fastener is used in automobiles etc. and must, therefore, be capable of providing an engagement of sufficient strength to withstand vibrations and shocks, so it is not an easy matter to remove the catch member from the vehicle body.

There has been a great need for a fastener which permits the attachment and detachment operations involved in automobile maintenance etc. to be performed more simply.

SUMMARY OF THE INVENTION

The object of the present invention is to provide a plastic fastener structure which makes it possible to carry out the fastening and fixing of two parts and the re-fastening thereof after detachment in a simple operation.

In order to achieve the above object, the fastening structure of this invention comprises: a plastic fastener consisting of a base, a first catch portion on one side of the base, and a second catch portion on the other side, the second catch portion having a stem which can be turned freely within a predetermined range; a first part having a mounting hole for engaging the first catch portion; and a second part having a mounting hole consisting of a large diameter portion for passage of the second catch portion and a small diameter portion to prevent extraction thereof.

The first catch portion engages with the mounting hole of the first part so as to be inextractable in the reverse direction. The second catch portion consists of a pair of resilient catch members projecting one on either side of the rotatable stem. By bringing the resilient catch members of the second catch portion opposite the small diameter portion of the mounting hole of the second part and pushing the fastener into said mounting hole while the first catch portion is still fastened to the first part, the resilient catch members are caused to bend inwardly and pass through the small diameter portion and become inextractably engaged therewith. In releasing this engagement, the second catch portion is turned with a suitable tool and the resilient members of the second catch portion are brought into line with the large diameter portion of the mounting hole of the second part and removed. Re-attachment can be carried out simply by inserting the second catch portion into the mounting hole of the second part.

The other objects and features of this invention will be clear from the following detailed description based on the attached drawings.

DESCRIPTION OF THE PREFERRED EMBODIMENTS

Figure 1A:
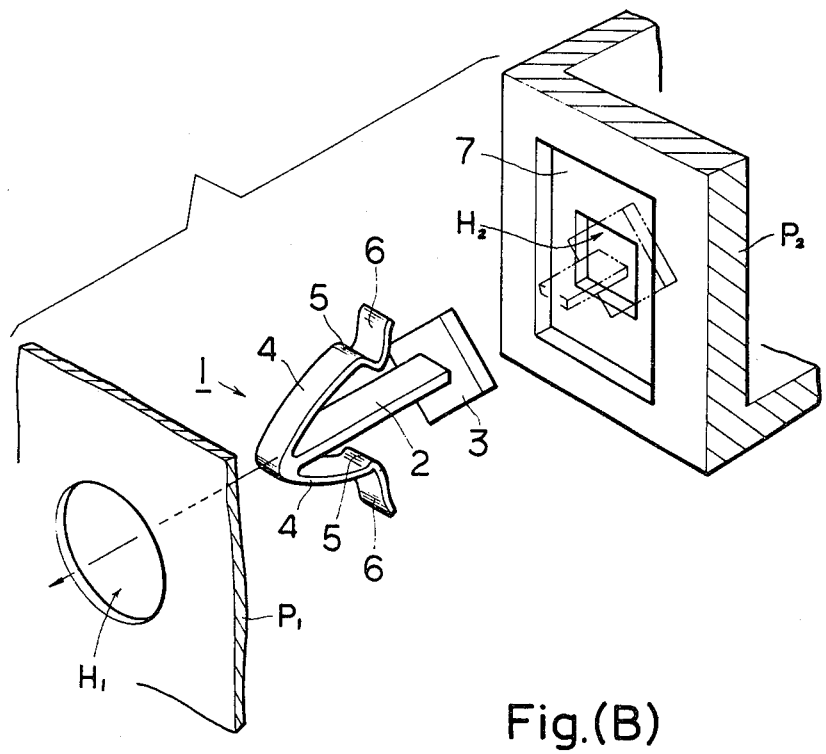
FIGS. 1(A), (B) and (C) are explanatory views of a typical example of a conventional fastening structure.

This invention relates to a fastening structure which uses a plastic fastener to attach two parts in an easy operation, and which enables attachment to be carried out again easily even after detachment.

Before describing the fastening structure of this invention, a prior art example (Japanese Patent Application Public Disclosure No. 99436/1980) will be described with reference to FIGS. 1(A)–1(C).

The parts to be fastened, $P_1$ and $P_2$, are fastened by means of plastic fastener 1. For the sake of simplicity, as was done in the above public disclosure, an example wherein part $P_1$ is a vehicle body and part $P_2$ a radiator grille will be used. Fastener 1 possesses a stem 2 extending in its axial direction, and a head 3 having a specific geometrical configuration—rhombic, for example—is integrally molded on one end thereof. Meanwhile, a pair of resilient members 4 open back and away from each other on the other end of the stem 2, and near their open ends are provided catch faces 5 destined to fit onto the edges of a mounting hole $H_1$ in body $P_1$. Also in the illustrated example, tongue pieces 6 are provided to extend from these catch faces 5.

A mounting hole $H_2$ is cut at the mounting part $P_2$ of the radiator grille. The configuration of this mounting hole is the same as that of the fastener head 3, but it is angularly out of phase with the head 3. In the illustrated example, it is a square hole equal in shape to what would be obtained by rotating the rhombic head 3 by 45° in its own plane. Its dimensions are such that if its phase is matched with that of the head 3, the head would just be able to pass therethrough.

First of all fastener 1 is attached to the part $P_2$. The phase of the fastener head 3 is adjusted so that it can fit into the mounting hole $H_2$ of the part $P_2$, and it is pushed in and passed through to the rear of the mounting hole $H_2$. The whole of the fastener 1 is rotated so that the head 3 returns to its original phase, thus mounting the fastener head 3 inextractably in the mounting hole $H_2$, as shown by the dotted lines in FIG. 1(A). At this time, the tongue pieces 6 come in contact with the inner edges of a recess 7 on the face of the part $P_2$, so the part $P_2$ becomes clamped between these tongue pieces 6 and the head 3 [see FIGS. 1(A), 1(B)].

Then when the fastener tip is pushed into the mounting hole $P_1$, the resilient members 4 are bent by the wall of the hole while passing therethrough, and at the point of the catch faces 5, they spring back to their original shape so that the catch faces 5 catch the hole edge. Attachment of parts $P_1$ and $P_2$ is thus completed (FIG. 1(B)).

When detachment is necessary, fastener 1 is not forced off from the first part $P_1$, but it is instead left attached, and only the grille is detached. This is because if it is forced off, the resilient members 4 will be damaged and become impossible to reuse.

Figure 1A:
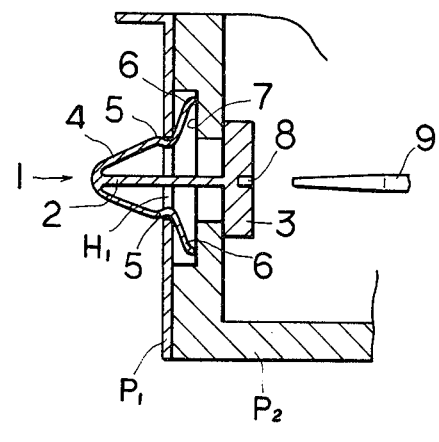
Figure 1C:
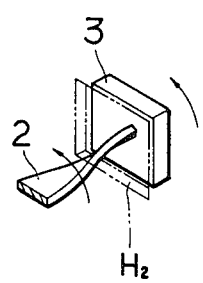

Detachment of the part $P_2$ is carried out by turning the fastener head 3 by, for example, inserting the tip of a screwdriver 9 into a slot 8 formed in the head and rotating the stem 2 as shown in FIG. 1(C) so as to match the phase of the head 3 with that of the mounting hole $H_2$. The part $P_2$ can then be pulled free.

However, with this conventional fastening structure, the re-attachment of the part $P_2$ can be accomplished in a mere push-in operation only from the same state as in the initial attachment—that is, with the fastener 1 mounted to this part $P_2$ in advance. This means that the fastener 1, which remains attached to the part $P_1$ after part $P_2$ is detached, must first be detached. This detachment operation is carried out by pressing the tongue pieces 6 in toward each other and bending the resilient members 4 inwardly and carefully extracting the fastener from the mounting hole $H_1$. Not only is this operation troublesome, it is also inefficient. This is because it entails the extra work of once detaching the fastener 1 from the part $P_1$ and then, after re-attaching the fastener to part $P_2$, re-attaching it to the part $P_1$.

Although the fastener 1 can be left mounted to the part $P_1$ if the fastener head 3 is rotated and passed through the mounting hole $H_2$ of the part $P_2$ when the re-attachment is carried out, this is an extremely awkward operation. For example, when the part $P_2$ is a relatively large object such as a radiator grille, the fastening structure described above is provided at several places around the rim of the grille. During detachment, the operation of turning the fastener head 3 at the first or the first few places and detaching the grille at these points is a relatively simple operation because the grille is still attached at the remaining places which bear a part of the weight, but during mounting, in particular, the operation at the first place must be carried out while the worker himself bears the weight of the grille so as to hold it in position, and in actual practice this operation is remarkably difficult, or close to impossible for one person.

The present invention was made in view of this point, and aims at providing a fastening structure capable of detachment and re-attachment which only requires that the fastener head be turned during detachment, and in which a mere push-in operation is sufficient for re-attachment, without need to detach the fastener from the other part to which it is already mounted. In short, it is a rationally designed fastening structure by means of which attachment can be carried out merely by a pressing force exerted between the two members being attached both in the initial attachment and all subsequent attachments as well, and detachment can be carried out by turning the fastener head.

The following is a description of one embodiment of this invention with reference to FIGS. 2–9.

Figure 2:
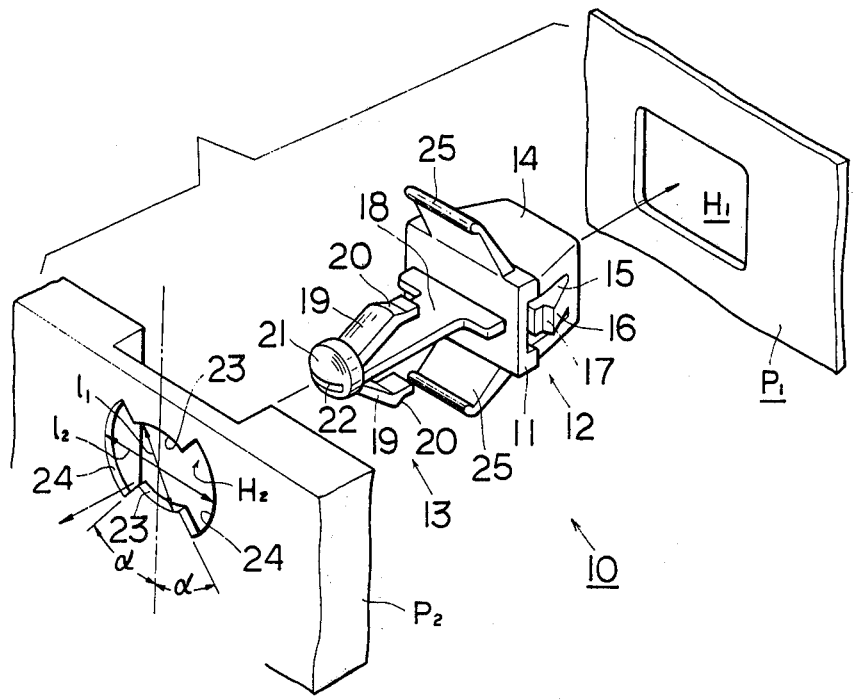
FIG. 2 is a perspective view of one embodiment of the present invention.

FIG. 2 shows an exploded perspective view of one embodiment of this invention, wherein the part $P_1$ and the part $P_2$ are fastened by a plastic fastener 10. This is easily understood when the part $P_1$ is considered as a body portion, such as a vehicle body, and the part $P_2$ is considered as a trim portion, such as a grille, wherein the part $P_2$ is to be fastened to part $P_1$ so as to be detachable therefrom.

In this figure the positions of the parts $P_1$ and $P_2$ are reverse to that in the example of a conventional fastening structure illustrated in FIGS. 1(A)–(C).

The fastener 10 possesses a flat base 11, on the front and back faces thereof are provided a resilient catch portion 12 facing towards the first part $P_1$ and a resilient catch portion 13 for engaging the second part $P_2$. In the present invention, the catch portion 13 for detachable engagement with the part $P_2$ is provided with special structural features, while as the catch portion 12 for engagement with the part $P_1$ (which can be regarded as fixed) there can be used the resilient members of the conventional example of FIG. 1 or any other known push-in snap catch structure of this kind.

Only a brief description of this catch portion 12 will be given here.

Trunk portion 14 is integrally provided on one side of the base 11 facing part $P_1$. In this embodiment a relatively sturdy box configuration with an interior void is used for the trunk portion 14, as can be understood from FIGS. 3 and 4. Flexible members 16 are provided on opposite sides of the trunk portion 14 (in the case of the drawing, the left and right sides) by making a three-sided slit 15 through the trunk portion 14 but leaving a fourth side near the tip uncut. The flexible members 16 project out from the sides of the trunk 14. Near the free end of each of these flexible members 16 is provided a reverse taper catch face 17, facing forward in this case, which catches the edge of the mounting hole $H_1$ of the first part $P_1$.

The configuration of the mounting hole $H_1$ of the part $P_1$ and the trunk 14 are complementary (both being rectangular in this embodiment). The mounting hole $H_1$ is of such a size that the trunk portion 14 can itself pass therethrough but that the outer faces of the flexible members 16 collide therewith.

Figure 3:
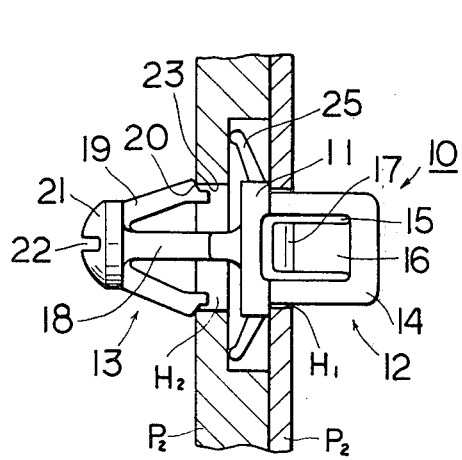
FIG. 3 is a side sectional view of the same.
Figure 4:
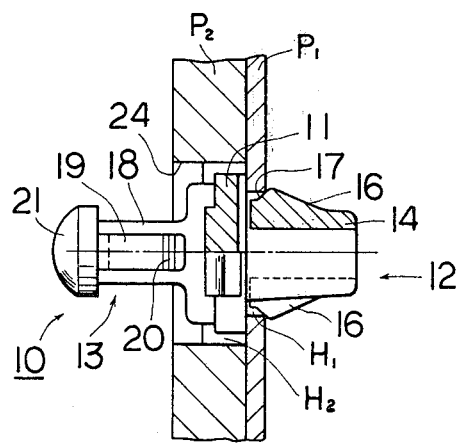
FIG. 4 is a sectional plan view of the same.

Consequently, if the tip of the trunk portion 14 is faced towards the mounting hole $H_1$ and pushed in, the flexible members 16 will be depressed into the hollow interior of the trunk portion 14 as they pass by the edges of the hole $H_1$ and will spring back to their original shape at the point where catches 17 come opposite the hole edges, with which they come into engagement to fix the fastener 10 and the part $P_1$ together (see FIGS. 3 and 4). When joining the parts $P_1$ and $P_2$, though, it is usual to carry out the operation by first attaching the fastener 10 to the part $P_2$, and then together attaching these parts to the part $P_1$ by means of the catch portion 12 in the manner just described. However, in the present invention the structure of the catch portion 13, which will be described later, makes it possible to freely select which part to attach to the fastener 10 first. For convenience of description, here the relation between the part $P_1$ and the catch portion 12 for engagement therewith was described first.

The reason the profile of the trunk portion 14 of the catch portion 12 for the part $P_1$ has been made substantially rectangular and the mounting hole $H_1$ has been given a complementary configuration is that this arrangement provides strength and prevents rotation between the fastener 10 and the part $P_1$. However, other rotation control means can also be adopted, as desired, from among those known to the art. For example, a separate projection can be provided on the base 11 and a depression to accommodate this projection be provided on the part $P_1$, in which case the trunk portion can be of cylindrical configuration. Moreover, the catch portion 12 for engaging the part $P_1$ can have any of various other known structures and may, for example, be of the canoe type, hook type or anchor type. The illustrated catch portion 12 is a modified anchor type.

Next the structure of the catch portion 13 for engaging the part $P_2$ and its mounting hole $H_2$ will be described.

A stem 18 displaying resilience in respect to rotation is provided so as to extend out from the base 11 and resilient catch members 19 are provided on this stem. The resilient catch members 19 are rooted on the tip of the stem 18 and extend towards the base 11, forming tapered arms which open away from each other toward their free ends. Near each of these free ends is provided a catch face 20 destined to catch a corresponding hole edge of a mounting hole $H_2$ described later.

In this embodiment, the tip of the stem 18 is provided with a head 21 shaped like a small cylinder and provided on its face with a slot 22 for receiving the tip of a screwdriver.

The mounting hole $H_2$ is formed of a small diameter portion and a large diameter portion each extending over a specific, predetermined angle so as to have an overall appearance roughly resembling a butterfly.

More specifically, if the relationship between the fastener 10 and the part $P_2$ is as shown in FIG. 2, namely if the resilient catch members 19 are located vertically, the portion including the vertical diameter L of the mounting hole $H_2$ is formed to have a small diameter $l_1$ and all portions separated from this vertical diameter L by more than $\pm\alpha$ (in the illustrated embodiment $\alpha<40°$) in the upward and downward directions are formed to have the large diameter $l_2$. The diameter $l_1$ between the opposite hole edges 23 of this small diameter portion is smaller than the maximum distance between the resilient catch members 19, while the distance $l_2$ between the opposite hole edges 24 of the large diameter portion is larger than this maximum distance.

Only the small diameter portion plays a role in the engagement between the part $P_2$ and the fastener 10. In the fastening operation, the catch portion 13 of the fastener 10 for engaging part $P_2$ is directed toward the mounting hole $H_2$ and pushed in as is from the tip of the stem 18. The pair of resilient catch members 19, which are rotated so as to register with the small diameter portion of the mounting hole $H_2$, eventually reach the hole edges 23 of the small diameter portion, and owing to the above dimensional relationship are bent inwardly and pass through the hole $H_2$. When the catch faces 20 begin to come out of the rear face of the hole $H_2$, the resilient catch members 19 return to their original state owing to their resiliency, and these catch faces 20 are caused to catch onto the small diameter portion hole edges 23, whereby joining of the fastener 10 and the part $P_2$ is completed (FIGS. 3, 4 and 5).

Furthermore, in this embodiment, there are provided elastic wing pieces 25 which slant out from the base 11 in opposite directions. These wing pieces 25 press against the surface of the part $P_2$ in the opposite direction to the catch faces 20 and provide mounting stability as well as ability to cope with variations in the thickness of the part $P_2$ around the mounting hole $H_2$.

After the part $P_2$ and the fastener 10 have been joined in this way, the fastening of the part $P_2$ to the part $P_1$ can be completed by attaching the fastener 10 to the part $P_1$ by a simple push-in operation as described previously (FIGS. 2, 3, 4 and 5). Although the figures do not show such a large object as a radiator grille, the fastening structure can be used to fasten such an object if an adequate number of the fastening structures are provided at appropriate positions on the periphery thereof.

Figure 5:
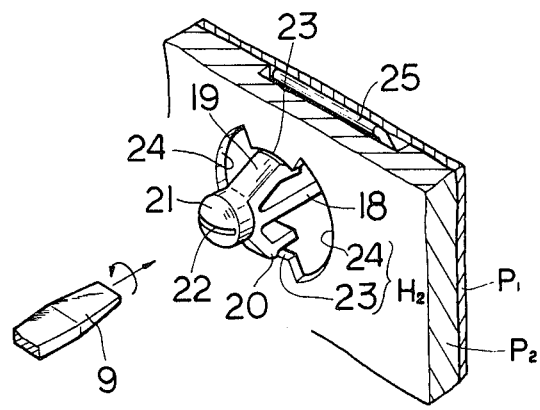
FIG. 5 is a perspective view of the main parts in an attached state.
Figure 7:
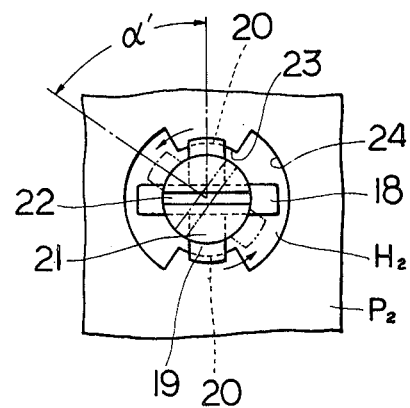
FIG. 7 is a plan view of the main parts for the purpose of describing attachment and detachment.
Figure 8:
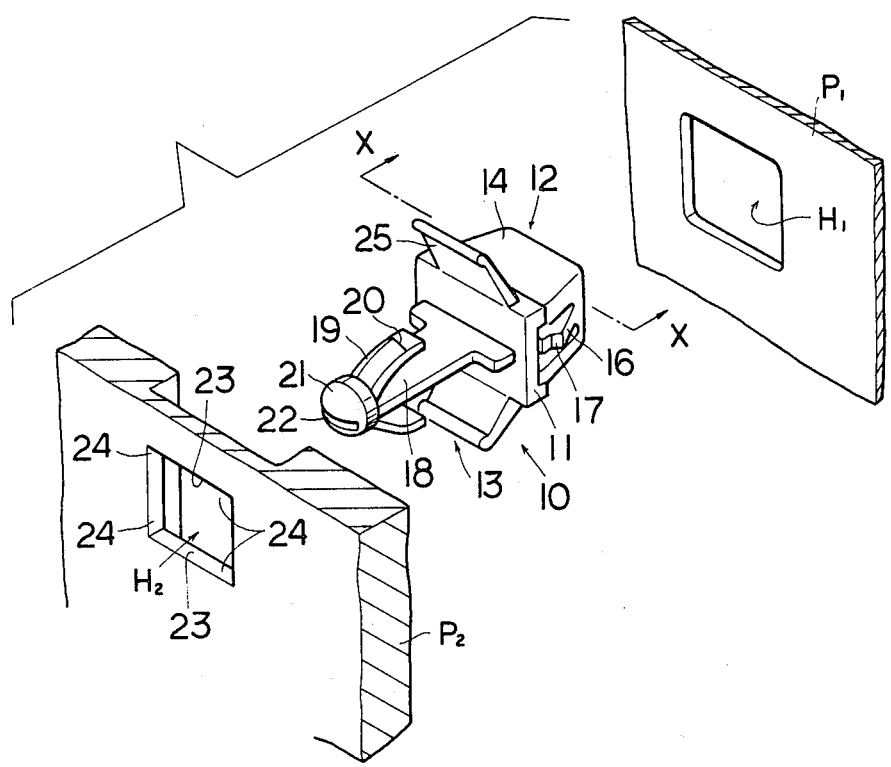
FIG. 8 is a perspective view of a second embodiment.

As shown in FIG. 5, when the part $P_2$ is to be detached from the part $P_1$, the stem 18 of the catch portion 13 for engaging the part $P_2$ is rotated as shown in FIG. 7, and the resilient catch members 19 engaged with the hole edges 23 at the small diameter portion of the mounting hole $H_2$ are rotated by an angle $\alpha'$ ($\alpha<\alpha'=40°$) so as to bring them opposite the large diameter portion. Since in this embodiment the slot 22 is formed in the head 21 of the stem 18, this operation can be performed by inserting a screwdriver 9 (FIG. 5) into this slot and turning it.

If the resilient catch members 19 are brought to the large diameter portion as shown by the dotted lines in FIG. 7, owing to the above dimensional relationship, the catch faces 20 of the resilient catch members 19 are freed (deprived of an object to catch on to), whereby the part $P_2$ can be detached from the fastener 10.

Figure 6:
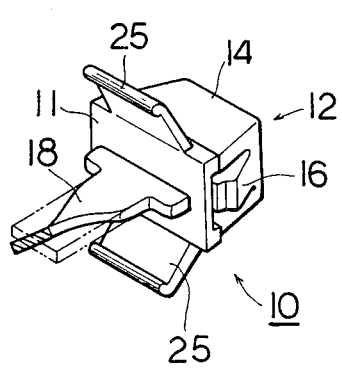
FIG. 6 is a diagram of the rotated state of a stem.

After the part $P_2$ is detached, the fastener 10 remains attached to the part $P_1$. However, once the screwdriver is removed from the slot 22, the stem 18 of the catch portion 13 is no longer subjected to a strong rotational force and therefore returns to its original shape because of its own resilience (FIG. 6). Thus the pair of resilient members 19 again return to their original vertical condition.

Consequently, the important point is that when re-attaching the part $P_2$, there is no need to turn the stem 18 again and there is also no need to detach the fastener 10 from part $P_1$ and then re-attach it to part $P_2$; all that need be done is to direct the mounting hole $H_2$ of the part $P_2$ toward the catch portion 13 of the corresponding fastener 10, which is still mounted to part $P_1$, and press it towards the part $P_1$.

The effect obtained in re-attachment by this pushing and snap action is the same as that described for the initial attachment. That is, the effect obtained is that of the resilient catch members 19, which have returned to their original position, making engagement with the small diameter portion hole edges 23 of the mounting hole $H_2$.

Therefore, to realize the effects described above in respect of this invention, all that is necessary is to form the mounting hole $H_2$ of the part $P_2$ so as to have a relatively small diameter portion 23 for engaging the resilient catch members 19 for engaging the part $P_2$ and a large diameter portion 24 through which the resilient catch members can pass in their normal state when rotated by an angle $\alpha'$ from this hole edge portion. Consequently, the arrangement shown in the drawing is not the only aperture configuration fulfilling these conditions, and a simpler arrangement would be the use of the difference between the side and diagonal lengths of a rectangular aperture.

The embodiment shown in FIGS. 8, 9A, 9B and 10 employs such an arrangement. Here the mounting hole $H_2$ of the part $P_2$ is a simple rectangular hole. The upper and lower hole edges 23 of this rectangular hole are the small diameter portion, and parts 24 near the ends of the diagonals are the large diameter portion. In conformity with this, the exterior configuration of each resilient catch member 19 of the catch portion 13 of the fastener 10 is formed like a chevron so as to fit the corner portion of the rectangular mounting hole $H_2$, and the maximum distance between the two resilient members 19 is larger than the distance $l_1$ between small diameter portions 23, and smaller than the distance $l_2$ (roughly the length of the diagonal) of the large diameter portions 24.

Figure 9A:
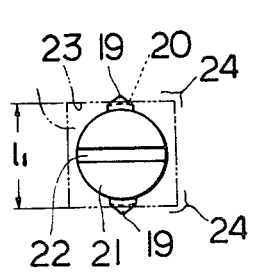
FIGS. 9(A) and (B) are explanatory views showing attachment and detachment, respectively.
Figure 9B:
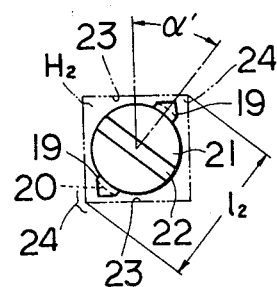

Consequently, similarly to the embodiment described above, the fastener 10 and the part $P_2$ are fastened by a push-and-snap catching action between the small diameter portion 23 and the catch faces 20 of the resilient catch members 19 (FIG. 9(A)), and at the time of detachment it is sufficient to rotate the stem 18 by an angle $\alpha'$ so as to position the catch pieces 19 (FIG. 9(B)) along one of the roughly diagonal large diameter portions 24. In this case, the size of the angle $\alpha'$ depends on the length or width of the rectangular hole; in the case of a square, it is roughly 45° or slightly less. In FIGS. 9(A) and (B), the mounting hole $H_2$ is shown only in outline by dotted lines.

Other aperture configurations can also be used insofar as they are in accord with the principles of this invention.

Figure 10:
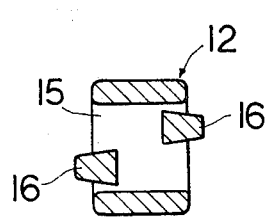
FIG. 10 is a cross-sectional view taken along line X—X of FIG. 8.

It was previously pointed out that a known arrangement will do for the catch portion 12 for engaging the part $P_1$. Also, as shown in FIG. 10, if the pair of flexible members 16 in the first embodiment are provided in a staggered arrangement as seen from above, it becomes possible to injection mold the catch portion 12 in a split mold.

Furthermore, in each of the above embodiments, the head 21 is provided on the tip of the stem 18 and the slot 22 is formed in the head. It is also of course possible to provide two intersecting slots. Otherwise, the slot 22 can be eliminated altogether and instead the periphery of the head 21 can be provided with knurling to prevent slipping when the head is held by the fingers or a tool and turned. Furthermore, if the stem 18 or the resilient members 19 can be turned directly, there is no special need for the enlarged head 21 at all.

In the illustrated embodiments, the stem 18 is flat, but cylindrical and other configurations are also possible. Also, the resilient catch members 19 are not limited to the type supported at one end only as shown in the figures. Instead, the inside of the free end of each member 19 can be connected to a point near the root of the stem 18 by means of a connector (not shown) in a bridge-like configuration. Other configurations are also possible.

In any event, as described above, through this invention not only is the desired end fulfilled and detachment possible when necessary, but also, the fastening of two parts is made possible through a simple straight-line motion both in the initial and any subsequent fastening operations. The invention furthermore provides a rational fastening structure with excellent workability which makes it unnecessary to remove the fastener from both of the fastened parts in detaching and re-attaching only one of them.

What is claimed is:

1. A fastener for detachably fastening first and second workpieces together, said first workpiece having a through aperture of predetermined shape, said second workpiece having a through aperture of predetermined shape including a first small diameter portion having first opposed edges spaced apart a first predetermined distance and a second annularly displaced portion having second opposed edges spaced apart a second relatively larger predetermined distance, said fastener comprising: a base, a first catch portion integral with and extending outwardly from a first side of said base, said first catch portion being insertable into and engageable within said first workpiece aperture for securing the fastener with respect to the first workpiece; a second catch portion integral with and extending outwardly from said base oppositely from said first catch portion, said second catch portion including an axially twistable resilient stem twistable in rotation relative to and independently of the base and the first catch portion remaining in engagement with the first workpiece from a normal relaxed position to a twisted rotated position reactively urged to return to the normal position and a pair of resilient catch members on the stem in distal relation to the base and normally assuming an outward position, said catch members including workpiece engageable surfaces normally spaced apart a distance greater than said first predetermined distance and less than said second predetermined distance, said catch members being resiliently collapsible upon axial insertion between said first opposed edges defining the first predetermined distance for enabling said surfaces to be snapped through said second workpiece aperture for engaging said first opposed edges and securing the second workpiece with respect to the fastener; and means integral with an outer end of said stem for enabling the stem to be twisted from its normal position relative to the base to its rotated position with bodily similar rotation of the catch members with the outer end of the stem relative to the base for angularly spacing said catch members in their normal outward positions for disengagement from said first opposed edges by registry thereof between the second opposed edges and for withdrawal from the second workpiece aperture between said second opposed edges whereby, upon disengagement of the fastener, the stem with the catch members is reactively rotated to the normal positions thereof in readiness for repeated snap reengagement of the catch members with the first opposed edges to assemble the fastener with the disengaged workpiece.

2. A fastener as defined in claim 1 wherein said last named means comprises slot means adjacent an outer end of said stem and engageable by a tool.

3. A fastener as defined in claim 1 which includes resilient means integral with and extending from said base for engaging the second workpiece in opposing relationship with respect to said catch members for resiliently clamping the second workpiece with respect to the fastener.

* * * * *

UNITED STATES PATENT AND TRADEMARK OFFICE
CERTIFICATE OF CORRECTION

PATENT NO. : 4,422,222

DATED : December 27, 1983

INVENTOR(S) : Yoshiaki Notoya

It is certified that error appears in the above-identified patent and that said Letters Patent is hereby corrected as shown below:

The Abstract should be changed to read as follows:

--A fastener for detachably fastening first and second workpieces together is disclosed. The first workpiece has a through aperture of predetermined shape. The second workpiece has a through aperture of predetermined shape which includes a first small diameter portion having first opposed edges spaced apart a first predetermined distance and a second annularly displaced portion having second opposed edges spaced apart a second, relatively larger predetermined distance. The fastener comprises a base, a first catch portion integral with and extending outwardly from a first side of the base, a second catch portion integral with and extending outwardly from the base oppositely from the first catch portion, and a twistable stem integral with the base for enabling at least one of the first and second catch portions to be twisted for angularly spacing such catch portion for disengagement of the fastener from the aperture of at least one of the first and second workpieces with which such catch portion is engaged.--

Signed and Sealed this

Third Day of April 1984

[SEAL]

Attest:

Attesting Officer

GERALD J. MOSSINGHOFF

Commissioner of Patents and Trademarks